April 26, 1966  F. B. HANNA  3,247,933
RADIO-CONTROLLED CABLE CLAMP
Filed Oct. 16, 1964  2 Sheets-Sheet 1

FRANK B. HANNA
INVENTOR.
BY Seed & Berry
ATTORNEYS

April 26, 1966  F. B. HANNA  3,247,933
RADIO-CONTROLLED CABLE CLAMP
Filed Oct. 16, 1964  2 Sheets-Sheet 2

FRANK B. HANNA
INVENTOR.

BY Seed & Berry
ATTORNEYS

United States Patent Office 3,247,933
Patented Apr. 26, 1966

3,247,933
RADIO-CONTROLLED CABLE CLAMP
Frank B. Hanna, Bellingham, Wash., assignor to Command Carriages Inc., a corporation of Washington
Filed Oct. 16, 1964, Ser. No. 404,346
9 Claims. (Cl. 188—137)

The present invention relates generally to clamping or locking devices for use in cable-supported carriages such as used in the logging industry. More particularly, the present invention contemplates a radio-controlled clamping device for gripping a cable or other strand so as to lock a movable carriage or the like with respect to the cable.

The present invention is of special utility in the logging industry wherein a stationary skyline or cable may be utilized for mounting a load-carrying and lifting apparatus known as a skyline carriage. The carriage is supported on the cable by a system of rollers or the like and is equipped with means for raising a number of logs which are then transported to a landing by moving the carriage along the skyline cable. In such instances, it is necessary to lock the carriage to the cable at the end of its travel in either direction along the cable, or at some intermediate point. For such use, the locking device should be simple in structure and yet rugged enough to withstand the abuse it must take when locking a heavily loaded carriage. Other features which are important in such locking devices are the ability to set the locking device with a minimum power requirement and the ability to selectively control the actuation of the locking device from a remote position by such means as a radio signal. Tortuous gripping of the cable is the preferred method of locking, such that the greater the force tending to move the carriage on the cable, the greater the gripping force becomes. In such an arrangement, the problem also arises of being able to easily release the gripping action.

Accordingly, the present invention provides a cable-clamping device for a skyline carriage which, when actuated, will grip the skyline cable regardless of the direction the carriage is traveling with respect to the cable and will readily release the cable when the direction of travel of the carriage is reversed. Thus the cable-clamping device of the present invention is reversible in its action and is self-releasing upon reversing the relative movement between the carriage and the cable. The clamping device according to the present invention also requires only a minimum expenditure of energy for actuation and provides for remote radio control of the actuating means.

Although the clamping device of the present invention may be utilized as a braking means for a cable-suspended carriage, those skilled in the art will appreciate that a wider range of utility exists in such situations where a cable or rope must be locked against movement with respect to any apparatus.

An object of the present invention is, therefore, the provision of a cable-clamping device for skyline carriages which is highly efficient, simplified in structure so as to utilize a minmum number of moving parts and possesses the capability of withstanding extremely heavy loads.

Another object of the present invention is the provision of a cable-clamping device for skyline carriages which is effective, when actuated, to lock the carriage to the cable against travel in either direction.

Another object of the present invention is to provide a clamping device of the character described which is self-releasing upon reversal of the relative movement between a cable and a cable-suspended carriage.

Another object of the present invention is the provision of a cable-clamping device of the character described which has an automatic self-wedging action for gripping a movable element and which requires minimum energy for actuation.

A further object of the present invention is the provision of a cable-clamping device which is of special utility in skyline carriages and which utilizes movable friction blocks associated with inclined surfaces for increasing the gripping force upon an increase in the force tending to produce relative movement between the carriage and the skyline cable.

A further object of the present invention is to provide a cable-clamping device for use in skyline carriages which is especially adapted for actuation from a remote position by a radio signal.

A further object of the present invention is to provide a cable-clamping device for use in skyline carriages which is adapted for actuation by a relatively low-power, short-stroke, linear actuator which may be radio controlled from a remote position.

A further object of the present invention is to provide a cable-clamping device of the character described which may be actuated by a radio-controlled electro-magnetic means.

Other more particular objects and advantages of the invention will, with the foregoing, appear and be understood from the following description and claims, the invention consisting of the novel construction and adaptation and combination of parts hereinafter described and claimed. Reference is made now to the accompanying drawings, in which:

Figure 1:
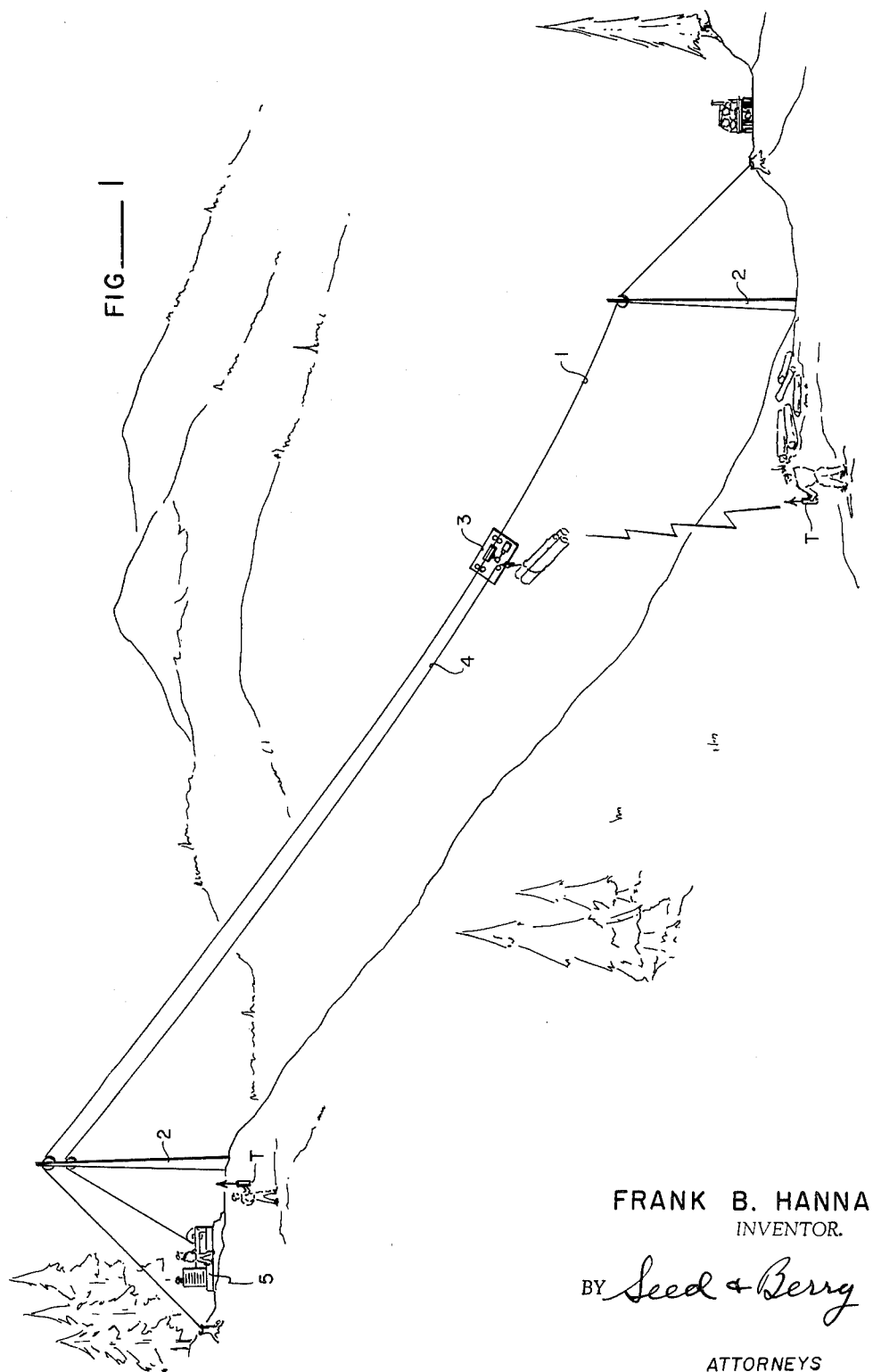
FIG. 1 is a perspective view illustrating a logging system including the radio-controlled clamping device of the present invention.

Referring now to the drawings wherein like reference numerals indicate identical parts in the various views, the radio-controlled cable clamp of the present invention is shown in combination with a skyline logging operation in FIG. 1. The particular setup shown is for downhill logging and involves the use of a stationary taut skyline cable 1 anchored at both ends to stumps or the like and supported above the ground by suitable spars 2. A movable carriage 3 is suspended on the skyline cable 1 by a system of rollers such that the carriage may be moved in either direction along the cable 1. The particular carriage shown by way of illustration is equipped with a hoisting cable 4 which is controlled by the yarder 5 for both hoisting a turn of logs and also returning the carriage to the top of the hill after the logs have been dropped. The carriage 3 is, of course, loaded at the top of the hill and allowed to descend the hill on the skyline cable 1 by gravity and by paying out the hoisting cable 4. For a more detailed understanding of the overall rigging system and a typical carriage structure, reference may be had to Patent No. 2,790,561, issued April 30, 1957, to Jacob Wyssen.

The details of the clamping device of the present invention may be understood from a reference to FIGS. 2–5 of the drawings. In FIGS. 2–5, only a portion of the carriage 3 is illustrated and it will be understood that the carriage is supported for movement along the cable 1 by means of rollers 6 and 7 which are mounted in a fixed position on the carriage 3 in any convenient location according to the design of the particular carriage being used. Since the details of the structure of the carriage and the hoisting mechanism carried thereby form no part of the present invention, only enough structure of the carriage has been illustrated to enable an understanding of the details of the clamping device and its novel cooperation with the movable carriage.

Figure 2:
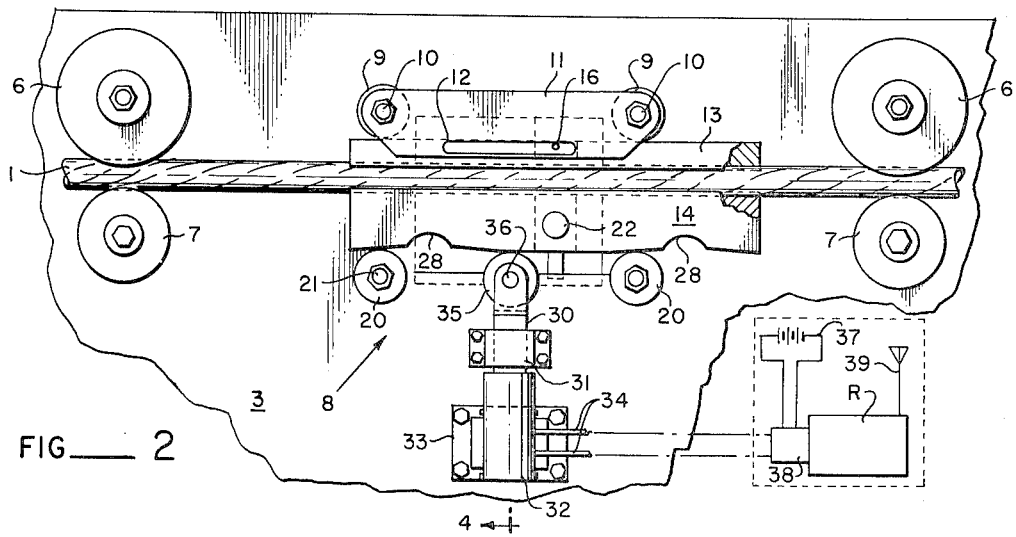
FIG. 2 is an elevational view of the locking device in the actuated position.

Referring to FIG. 2, the clamping device is indicated generally at 8 and is mounted directly to the carriage 3 as will be explained. A first pair of roller members 9 is located on one side of the cable 1 and suitably mounted for free rotation on the bolts 10 which extend through a portion of the body of the carriage 3 as illustrated. In most applications, the bolts 10 should be made of hardened steel or the like in order to withstand lateral or shear stress which occurs during wedging of the gripping elements and the particular material utilized will depend on the use for which the clamping device is designed. A flat guide plate 11 is also carried on the bolts 10 and extends between the rollers with an elongated slot 12 being provided in the edge of the plate which is adjacent the cable 1.

The gripping action is obtained by an anvil block 13 and on opposing friction shoe 14 which constitute the clamping or gripping members of the device. Both of the clamping members are moved into frictional engagement with the cable 1 when the device is actuated as will presently be explained in detail. The anvil block 13 may be made of a suitable metal or any desirable frictional material depending on the character of the cable or rope 1 to be gripped. The length and width of the anvil block 13 will also be chosen in accordance with the size of the cable 1 and will include a rounded concave friction surface 15 on one side for contacting the cable. A guide pin 16 is carried on the mid-portion of the front face of the anvil block 13 and extends through the slot 12 in the guide plate 11 to support the anvil block when the clamping device is in the unactuated position shown in FIG. 3. The anvil block 13 also includes a rearward projection 17 which extends through an opening in the carriage 3 and is provided with a downwardly extending post member 18. The bottom end of the post 18 may bear against a suitable shoulder on the carriage, as illustrated, to maintain the anvil in position.

The friction shoe 14 may be of the same length and thickness as the anvil block 13 and also includes a concave curved friction surface 19 on its upper side for contacting the cable 1 when the clamping device is actuated. As will be presently explained in detail, the bottom side of the shoe 14 is formed with inclined surfaces and is supported for longitudinal movement on a second set of rollers 20 located on the opposite side of the cable from the rollers 9 and aligned therewith. The rollers 20 are mounted for free rotation on the bolts 21 which extend through a portion of the carriage 3 and which will be designed to withstand shear stress as in the case of the bolts 10. A pin member 22 extends through a suitable cross bore 23 in the mid-portion of the shoe 14 with clearance enough to allow the shoe to pivot relative to the pin. The pin 22 rigidly connects to a guide block 24 located adjacent the back side of the shoe 14 within the opening in the carriage 3. The block 24 is provided with a vertical bore 25 through which the post 18 of the anvil 13 extends. Enough clearance should be allowed between the post 18 and the bore 25 to permit a certain amount of loose movement. With this relationship, it will be apparent that the anvil block 13 and the shoe 14 may be moved toward each other to effect the gripping action of the cable 1. The members 13 and 14 are also permitted to move longitudinally in either direction from the centered position shown in FIG. 3 to the position, for instance, shown in FIG. 2 wherein the shoe and anvil block are in gripping relationship with the cable. The pin 16 in slot 12 serves to guide the motion of the anvil block 13 while the downwardly extending post 18 and guide block 24 carry the shoe 14 along with the anvil 13 and vice versa.

Figure 3:
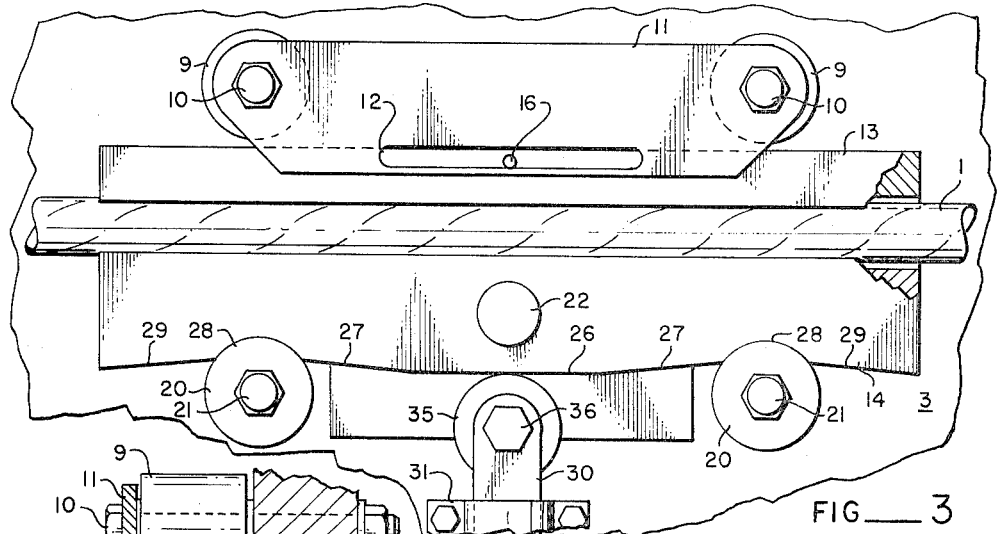
FIG. 3 is an elevational view of the locking device in the released position.

As illustrated in the drawings, the shoe 14 is symmetrical about a vertical transverse plane passing through the center of the shoe. The center section of the bottom side of the shoe 14 has a substantially flat or slightly curved section 26 with upwardly inclined surfaces 27 extending from the section 26 to the arcuate recesses 28. The bottom surface of each end of the shoe is then inclined downwardly and outwardly as at 29 between the recesses 28 and the outer edges of the shoe. The inclined surfaces 27 and 29 constitute cam surfaces for effecting the wedging action of the gripping members 13 and 14 as will be explained. It will be noted that the radius of curvature of the arcuate recesses 28 is approximately equal to the radius of the rollers 20, with the arcuate recesses being spaced on center lines substantially equal to the center line spacing of the rollers 20. With this arrangement, the shoe 14, in the released position shown in FIG. 3, is supported on the rollers 20 which engage the recesses 28.

Figures 4, 5:
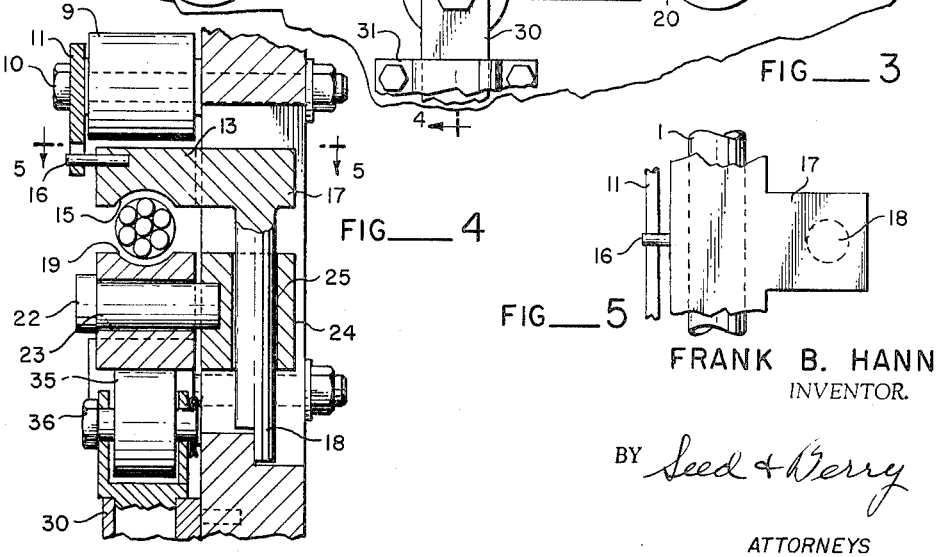
FIG. 4 is a cross-sectional view taken along line 4—4 of FIG. 3.
FIG. 5 is a view taken along line 5—5 of FIG. 4.

To complete the structure of the clamping device, a reciprocable actuator rod 30 is positioned to move vertically within the guide 31 mounted below the shoe 14. The actuator rod 30 is connected at its lower end to be operated by the armature of a suitable solenoid unit 32 carried on the bracket 33 on the face of the carriage 3. Electrical current may be supplied to the solenoid 32 by suitable conductors 34. The upper end of the actuator rod 30 is bifurcated as illustrated in FIG. 4 for mounting a contact roller 35, freely rotatable on a pin or bolt 36. When the solenoid unit 32 is deenergized, the actuator arm 30 retracts allowing the friction shoe 14 to come to rest in its centered position as shown in FIG. 3. With the shoe 14 in the centered position shown in FIG. 3, the cable 1 is free to move in either direction between the shoe and the anvil block 13 which is supported by the pin 16. It will be understood, of course, that sufficient clearance should be provided between the shoe 14 and the anvil block 13, when in the released position, to maintain these elements completely out of contact with the cable 1 so that no drag force is exerted on either of these elements which would tend to move them to the right or left of the center position. When the solenoid 32 is energized, the actuator rod 30 is moved to the extended position shown in FIG. 2, causing the shoe 14 to contact the moving cable 1 for moving the shoe and the anvil block into the gripping position shown in FIG. 2.

The solenoid unit 32 may be any one of a multitude of commercially available power units familiar to those skilled in the art and its capacity will depend upon the size and weight of the clamping unit 8. In all instances, the solenoid unit may be relatively small in size since the unit does not apply the actual gripping force on the cable 1. The solenoid actuator serves to initially lift the bottom shoe 14 into light frictional contact with the cable 1 and to start the incline surfaces 27 and 29 onto the rollers 20 to initiate the camming action which results in the tortuous gripping of the cable. Thus it will be obvious that only a low-power, short-stroke linear movement is necessary. It is also to be noted that a solenoid action is ideal for supplying the initial actuation of the clamping device since the ideal actuating force for such a clamping device is a rapid positive linear force which need only be of a short duration. The electrical power for energizing the solenoid 32 may be obtained from a storage battery or the like 37 through a set of switching contacts or relay 38. The operation of the relay 38 is controlled by a conventional radio receiver R which picks up a transmitted signal from the antenna 39. The radio receiver unit R may be any such unit well-known in the electrical arts and may be of the battery-powered type with any suitable means for amplification to produce the signal for operating the relay 38. As shown in FIG. 1, the signal picked up by the receiver R may be transmitted by a conventional low-power radio transmitter T operated by a person on the ground at either end of the skyline cable 1. Normally, no more than a two watt, hand-size transmitter is necessary and even less power is adaquate since the distance between the operator on the ground and the carriage unit is relatively small and no interference or obstructions are normally present.

Since no claim is made to the details of either the transmitter or receiver units and only conventional equipment well-known to the electrical art are contemplated, these items are shown only schematically in the drawings.

Following through with the mode of operation of the carriage 3 and the application of the clamping device 8, and assuming that a turn of logs has been hoisted and locked to the carriage at the top of the slope as indicated in FIG. 1, the down-hill travel of the carriage 3 is initiated by the operator of the yarder 5 who begins to pay out slack in the hoisting cable 4. As aforementioned, the clamping device 8 is self-releasing and, although previously locked at the top of the slope, the clamping members 13 and 14 will be returned to the released position shown in FIG. 3 once the operator of the yarder allows a slack condition to exist in the hoisting cable 4. Gravity begins to act on the loaded carriage 3 which moves the carriage with respect to the skyline cable 1. With the clamping device released, the carriage 3 will descend freely on the skyline cable 1 by means of its roller supports 6 and 7. Enough clearance is provided between the shoe and anvil block to allow the carriage to move freely along the cable 1 and the weight of the shoe 14 maintains it in the centered position with the rollers 20 engaging the recesses 28. This condition will be maintained as long as the solenoid actuator 32 is de-energized. When the operator at the bottom of the slope illustrated in FIG. 1 desires to lock the carriage to the cable, a radio signal is initiated by means of the transmitter T and is picked up by the receiver R which operates the contacts of the relay 38. As the contacts of the relay 38 are closed, the solenoid 32 is energized to lift the shoe 14 a slight distance to lightly engage the cable 1. The operator of the transmitter T may visually observe the action of the clamping device and solenoid actuator and thus determine the duration of the radio signal which is necessary to set the clamping device. The motion of the cable with respect to the clamping device will cause the shoe 14 and the anvil block 13 to move to one side or the other of the centered position shown in FIG. 3. In case of clamping during a downhill motion, the clamping members would move to the left of the centered position shown in FIG. 3 to grip the cable by means of the cam action between the rollers 20 and the inclined surfaces 27 and 29. As the shoe 14 and the anvil block 13 start to follow the cable, the inclined cam surfaces 27 and 29 start to ride up on the rollers 20, moving the shoe and anvil block toward each other. The shoe 14 is thus forced toward the anvil block 13 which is backed up by the rollers 9 and a tight grip is obtained on the cable to lock it against further movement in relation to the carriage 3. As the shoe and anvil block move into gripping contact with the cable, any further force tending to move the carriage serves to further increase the gripping action. After the carriage has been stopped by the operator at the bottom of the slope in the desired position, other controls on the carriage may be utilized in releasing and lowering the turn of logs. After the logs have been deposited, the hoist line 4 is pulled back up to the carriage and locked and the yarder 5 is used to again pull the carriage back up to the top of the slope. Reversing the motion of the carriage 3 automatically releases the clamping device 8 to allow the carriage to freely move up the cable. When the carriage reaches the desired position at the top of the slope, an operator with a transmitter unit may selectively lock the carriage in the desired position for picking up another turn of logs.

It will be readily apparent to those skilled in the art that the present invention provides novel and useful improvements in locking devices of the character described. The arrangement and types of structural components utilized within the invention may be subjected to numerous modifications well within the purview of this invention and applicant intends only to be limited to a liberal interpretation of the specification and appended claims.

Having thus described the invention, what is claimed as new and desired to be secured by Letters Patent is:

1. In a logging system including a skyline cable, a carriage mounted for travel along said skyline cable and means to move said carriage, a cable clamping device comprising; first and second clamping members on said carriage arranged for relative movement toward and away from each other for gripping said cable, means for mounting said first clamping member for longitudinal movement in either direction parallel to the cable, a first pair of fixed rollers for contacting said first clamping member on the side thereof remote from said cable, means connecting said second clamping member to said first clamping member for movement therewith in either longitudinal direction, a second pair of longitudinally spaced fixed roller member adjacent the surface of said second clamping member remote from said cable, arcuate recesses in the side of said second clamping member adjacent said second pair of rollers and being spaced a distance substantially equal to the spacing of said rollers, oppositely inclined cam surfaces on said second clamping member adjacent each recess, electro-magnetic actuator means for moving said second clamping member toward said cable, an electrical power source on said carriage, radio receiver means on said carriage, and switch means responsive to said radio receiver for selectively connecting said actuator to said power source, whereby energization of said actuator by remote radio signal will initially move said first clamping member toward said cable for wedging said clamping members by the action of said second rollers and said cam surfaces.

2. In a logging system including a skyline cable, a carriage mounted for travel along said skyline and means to move said carriage, a cable clamping device comprising; a pair of clamping members on said carriage, means for mounting said clamping members for relative movement toward and away from each other and in either direction parallel to said cable, a pair of longitudinally spaced fixed rollers adjacent one of said clamping members, arcuate recesses in the surface of said one clamping member for engagement with said rollers, oppositely inclined cam surfaces on said one clamping member adjacent each recess, electro-magnetic actuator means for moving said clamping members toward each other, an electrical power source on said carriage, radio receiver means on said carriage, and switch means responsive to said radio receiver for selectively connecting said actuator means to said power source, whereby energization of said actuator by remote radio signal will initially move said clamping members toward each other for wedging said clamping members by the action of said rollers and said cam surfaces.

3. In a logging system including a skyline cable, a carriage mounted for travel along said skyline and means to move said carriage, a cable clamping device comprising; a pair of clamping members on said carriage, means for mounting said clamping members for relative movement toward and away from each other and in either direction parallel to said cable from a centered rest position, a pair of fixed rollers adjacent one of said clamping members, a pair of recesses in said one member for contacting said rollers to hold said clamping members in the centered position out of contact with the cable, cam means adjacent said recesses for contacting said rollers to move said clamping members together upon movement in either direction from the centered position, electrically powered actuator means for initially moving said clamping members toward each other, and radio signal means for selectively controlling the energization of said actuator.

4. In combination with a movable cable mounted carriage, a clamping device comprising; clamping members positioned on each side of said cable, means connecting said clamping members for movement toward and away from each other and concurrently in either direction along the axis of the cable, fixed cam means mounted adjacent one of said clamping members, oppositely inclined cam surfaces on said one clamping member for contacting said cam means to move said clamping members toward each other upon movement in either direction along the axis of the cable from a centered position, means for retaining said clamping members in the centered position, and radio signal controlled electrical actuating means for moving said one clamping member into frictional contact with said cable.

5. In combination with a movable cable mounted carriage, a clamping device comprising; a pair of clamping members, means for retaining said clamping members in a centered released position, cam means for moving said clamping members into tortuous gripping engagement with said cable upon movement in either direction from said centered position, linear actuating means movable in a direction perpendicular to the axis of said cable for moving said clamping members into light frictional contact with said cable, and radio controlled electrical power means for selectively moving said actuating means.

6. A cable clamping device comprising in combination; first and second clamping members on opposite sides of a cable to be clamped, means for guiding said first clamping member for movement in a direction parallel to the cable, a first pair of fixed rollers adjacent said first clamping member for limiting movement thereof away from the cable, a post member connected to the mid-portion of said first clamping member and extending at right angles thereto, a slidable block on said post, means connecting said second clamping member to said block for guiding said second clamping member toward and away from said first clamping member while causing said clamping members to move concurrently in either direction parallel to the cable, a second pair of fixed rollers adjacent said second clamping member, a pair of arcuate recesses in the second clamping member for engagement with said second pair of rollers to maintain said clamping members in a centered released position, oppositely inclined cam surfaces on said second clamping member adjacent each recess for contacting said second rollers to move said clamping members toward each other into frictional contact with said cable upon movement in either direction from said centered position, a linear actuator movable in a fixed path at right angles to said cable, roller means on said actuator for contacting said second clamping member, and means for selectively moving said actuator.

7. A cable clamping device comprising in combination; first and second clamping members on said carriage arranged for relative movement towards and away from each other for gripping said cable, means for mounting said first clamping member for longitudinal movement in either direction parallel to the cable, a first pair of fixed rollers for contacting said first clamping member on the side thereof remote from said cable, means connecting said second clamping member to said first clamping member for movement therewith in either longitudinal direction, a second pair of longitudinally spaced fixed roller members adjacent the surface of said second clamping member remote from said cable, arcuate recesses in the side of said second clamping member adjacent said second pair of rollers and being spaced a distance substantially equal to the spacing of said rollers, oppositely inclined cam surfaces on said second clamping member adjacent each recess, and electro-magnetic actuator means for moving said second clamping member toward said cable.

8. A cable clamping device comprising in combination; a pair of clamping members, means for mounting said clamping members for relative movement toward and away from each other and in either direction parallel to said cable from a centered rest position: a pair of fixed rollers adjacent one of said clamping members, a pair of recesses in said one member for contacting said rollers to hold said clamping members in the centered position out of contact with the cable, cam means adjacent said recesses for contacting said rollers to move said clamping members together upon movement in either direction from the centered position, and electrically powered actuator means for moving said clamping members toward each other.

9. In combination, clamping members positioned for gripping a cable, means for connecting said clamping members for movement toward each other and concurrently in a direction along the axis of the cable, fixed cam means adjacent one of said clamping members, an inclined cam surface on one of said clamping members for contacting said cam means to move said clamping members toward each other upon movement along the axis of the cable, and electrically powered linear actuating means for selectively moving said one clamping member into light frictional contact with the cable.

References Cited by the Examiner

UNITED STATES PATENTS

| | | | |
|---|---|---|---|
| 1,846,537 | 2/1932 | Withrow | 188—42 |
| 2,091,056 | 8/1937 | Stack | 188—42 |
| 2,529,804 | 11/1950 | Harnischfeger et al. | 212—21 X |
| 3,022,747 | 2/1962 | McIntyre. | |
| 3,058,601 | 10/1962 | Wyssen | 219—92 X |

SAMUEL F. COLEMAN, *Primary Examiner.*